United States Patent
Dimotakis

(10) Patent No.: US 8,559,801 B2
(45) Date of Patent: Oct. 15, 2013

(54) BALL TURRET HEAT SINK AND EMI SHIELDING

(75) Inventor: Manolis Pavlos Dimotakis, Altadena, CA (US)

(73) Assignee: Aerovironment, Inc., Monrovia, CA (US)

( * ) Notice: Subject to any disclaimer, the term of this patent is extended or adjusted under 35 U.S.C. 154(b) by 0 days.

(21) Appl. No.: 13/220,617

(22) Filed: Aug. 29, 2011

(65) Prior Publication Data

US 2013/0051778 A1   Feb. 28, 2013

(51) Int. Cl.
*G03B 39/00* (2006.01)

(52) U.S. Cl.
USPC .............................. 396/12; 396/13

(58) Field of Classification Search
USPC .......... 252/512; 361/714; 396/12–13; 701/16
See application file for complete search history.

(56) References Cited

U.S. PATENT DOCUMENTS

| | | | |
|---|---|---|---|
| 3,638,502 A | 2/1972 | Leavitt et al. | |
| 4,217,606 A | 8/1980 | Nordmann | |
| 5,153,623 A | 10/1992 | Bouvier | |
| 5,251,118 A * | 10/1993 | Budnovitch et al. | 362/362 |
| 5,383,645 A | 1/1995 | Pedut et al. | |
| 5,897,223 A * | 4/1999 | Tritchew et al. | 396/13 |
| 6,056,237 A * | 5/2000 | Woodland | 244/3.15 |
| 6,147,701 A | 11/2000 | Tamura et al. | |
| 6,226,125 B1 | 5/2001 | Levy et al. | |
| 6,628,338 B1 | 9/2003 | Elberbaum et al. | |
| 7,000,883 B2 | 2/2006 | Mercadal et al. | |
| 7,058,721 B1 | 6/2006 | Ellison et al. | |
| 7,695,647 B2 * | 4/2010 | Smela et al. | 252/512 |
| 7,747,364 B2 | 6/2010 | Roy et al. | |
| 7,955,006 B1 | 6/2011 | Harvey | |
| 8,091,833 B2 | 1/2012 | von Flotow et al. | |
| 8,137,007 B1 | 3/2012 | Harvey | |
| 8,140,200 B2 | 3/2012 | Heppe et al. | |
| 8,174,612 B1 | 5/2012 | Koehler | |
| D662,120 S | 6/2012 | Deurwaarder | |
| 8,226,039 B2 | 7/2012 | von Flotow et al. | |
| D668,701 S | 10/2012 | Ohno et al. | |
| 2004/0026573 A1 | 2/2004 | Andersson et al. | |
| 2004/0173726 A1 | 9/2004 | Mercadal et al. | |
| 2004/0230352 A1 | 11/2004 | Monroe | |
| 2006/0033288 A1 | 2/2006 | Hughes et al. | |
| 2006/0110155 A1 | 5/2006 | Kouchi et al. | |
| 2006/0231675 A1 | 10/2006 | Bostan | |
| 2008/0267612 A1 | 10/2008 | Harvey | |
| 2009/0216394 A1 * | 8/2009 | Heppe et al. | 701/16 |
| 2009/0218447 A1 | 9/2009 | von Flotow et al. | |
| 2009/0284644 A1 | 11/2009 | McKaughan et al. | |

(Continued)

OTHER PUBLICATIONS

PCT International Search Report, Date of Mailing: Mar. 18, 2013, International Application No. PCT/US12/52727, International Filing Date: Aug. 28, 2012, Authorized Officer: Linda Sholl.

(Continued)

*Primary Examiner* — Clayton E Laballe
*Assistant Examiner* — Kevin Butler
(74) *Attorney, Agent, or Firm* — Nixon Peabody LLP; Eric Aagaard

(57) ABSTRACT

A water resistant and electromagnetically shielded turret assembly, suitable for attachment to the undersurface of an unmanned surveillance aircraft. The turret, in its several variations, may contain one or more cameras, and may contain an internal positioning motor, which can be easily accessible for servicing.

22 Claims, 9 Drawing Sheets

(56) References Cited

U.S. PATENT DOCUMENTS

| | | |
|---|---|---|
| 2010/0141503 A1 | 6/2010 | Baumatz |
| 2010/0241931 A1 | 9/2010 | Choi et al. |
| 2010/0309344 A1 | 12/2010 | Zimmer et al. |
| 2011/0103021 A1* | 5/2011 | Janssen et al. ............ 361/714 |
| 2012/0104169 A1 | 5/2012 | von Flotow et al. |
| 2012/0106800 A1 | 5/2012 | Khan et al. |
| 2012/0200703 A1 | 8/2012 | Nadir et al. |
| 2012/0320203 A1 | 12/2012 | Liu |
| 2013/0048792 A1 | 2/2013 | Szarek et al. |

OTHER PUBLICATIONS

PCT International Search Report, Date of Mailing: Mar. 19, 2013, International Application No. PCT/US12/52728, International Filing Date: Aug. 28, 2012, Authorized Officer: Teri Luu.

Office Action in U.S. Appl. No. 13/220,562 dated Nov. 23, 2012.

PCT International Search Report and Written Opinion in International Application No. PCT/US12/52723, mailed on May 3, 2013.

PCT International Search Report and Written Opinion in International Application No. PCT/US12/52725, mailed on May 3, 2013.

PCT International Search Report and Written Opinion in International Application No. PCT/US12/52729, mailed on May 13, 2013.

Notice of Allowance in U.S. Appl. No. 13/220,562, mailed on May 1, 2013.

PCT International Search Report and Written Opinion in International Application No. PCT/US12/52727, mailed on Mar. 18, 2013.

PCT International Search Report and Written Opinion in International Application No. PCT/US12/52728. , Date of Mailing: Mar. 19, 2013.

Notice of Allowance in U.S. Appl. No. 13/220,617, mailed on Jun. 10, 2013.

Office Action in U.S. Appl. No. 13/220,535, mailed on Aug. 2, 2013.

\* cited by examiner

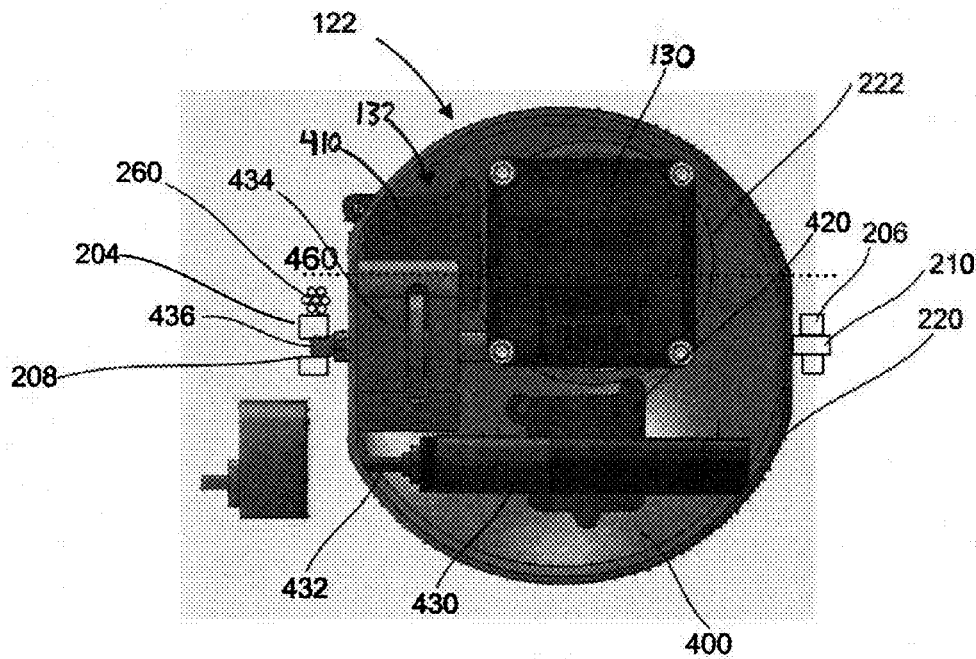
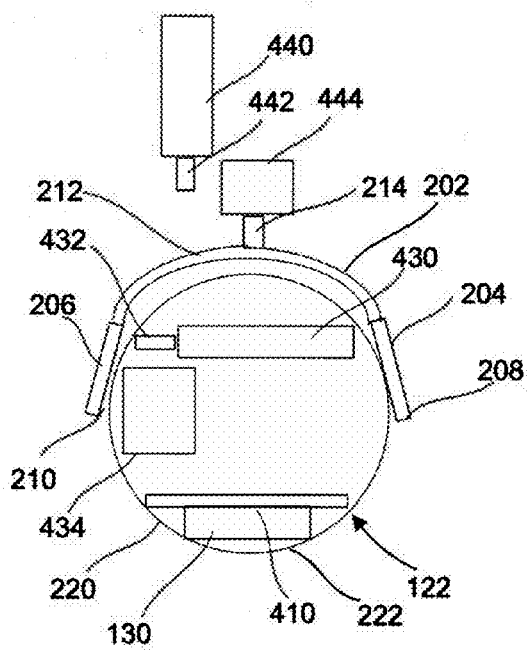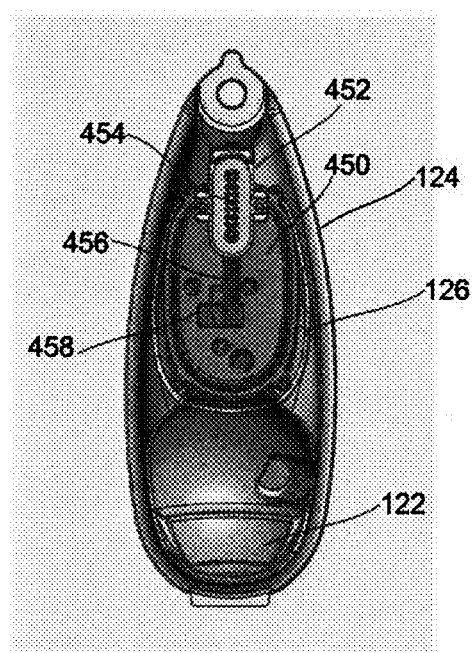

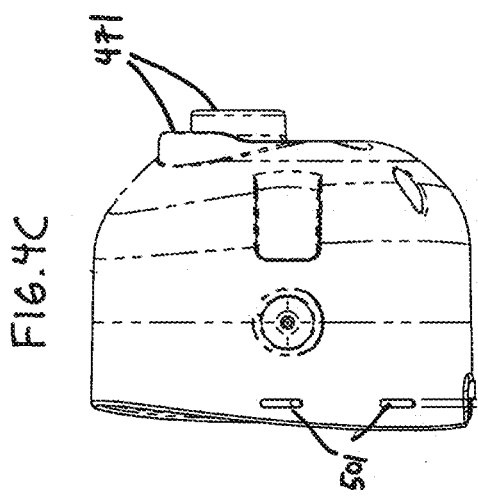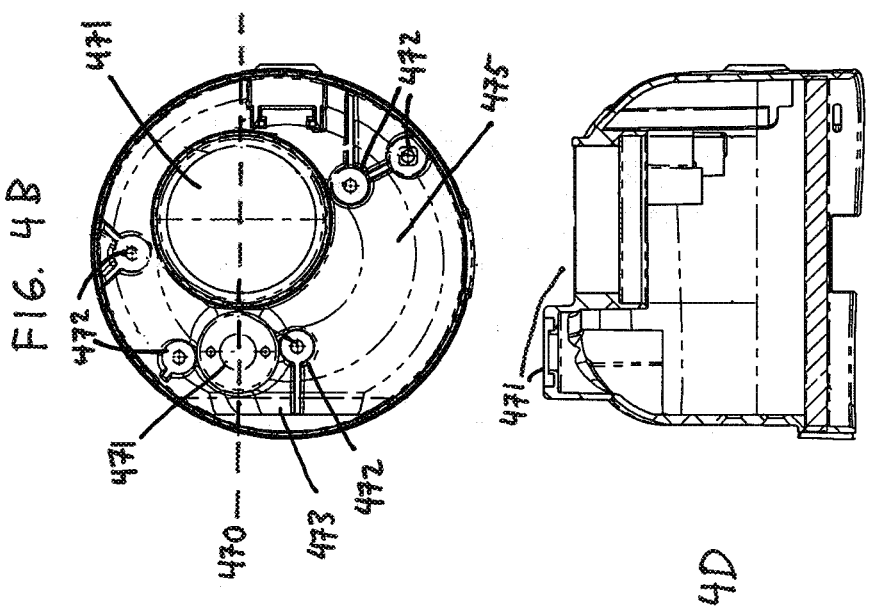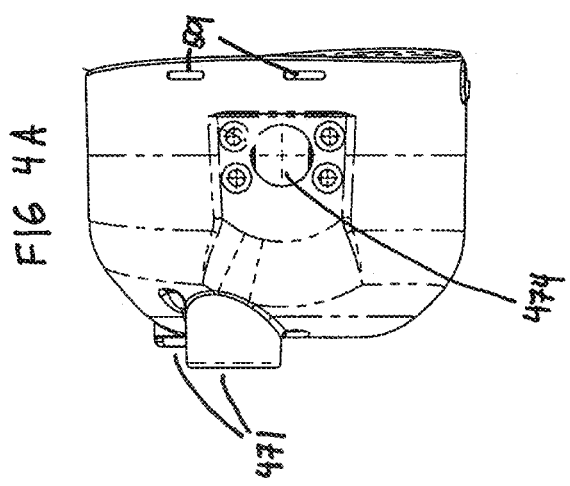

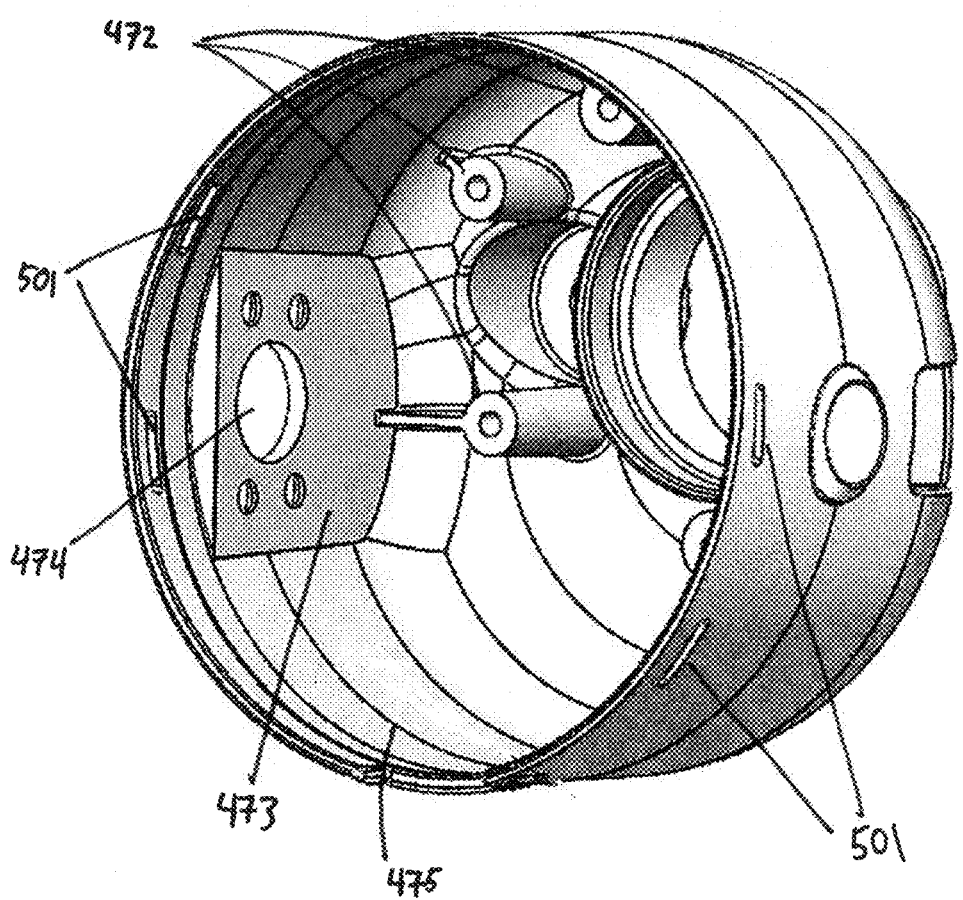

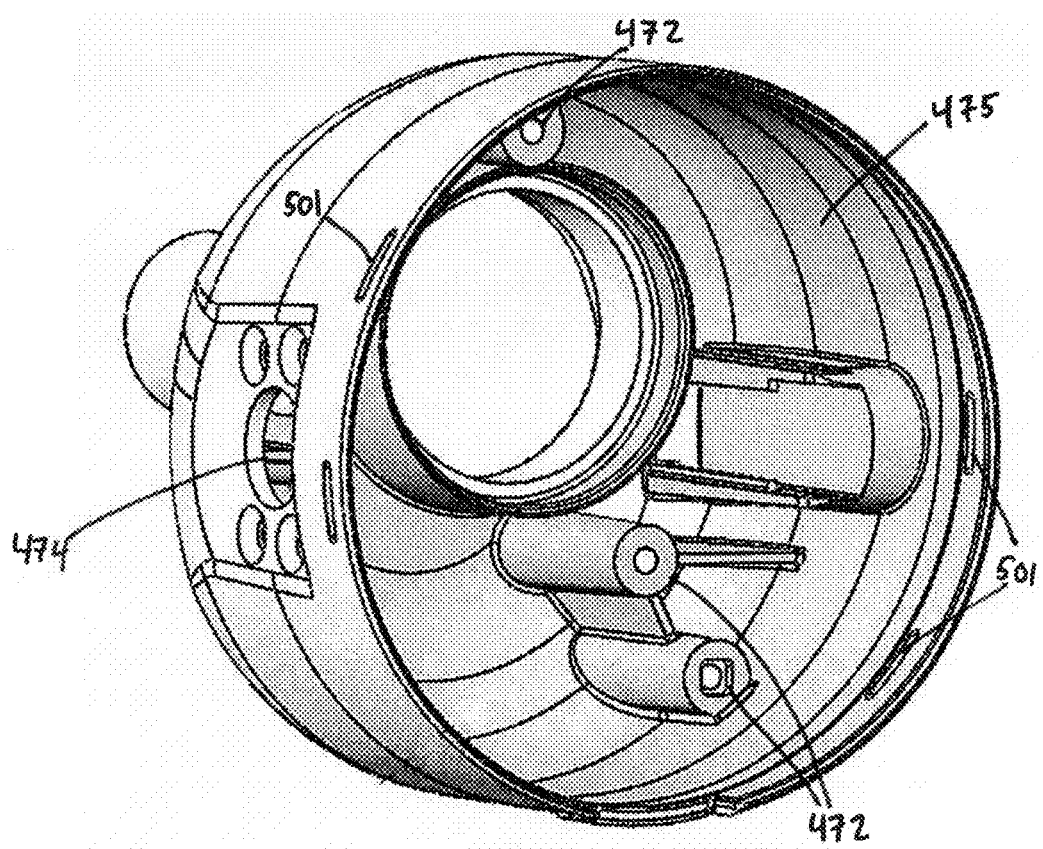

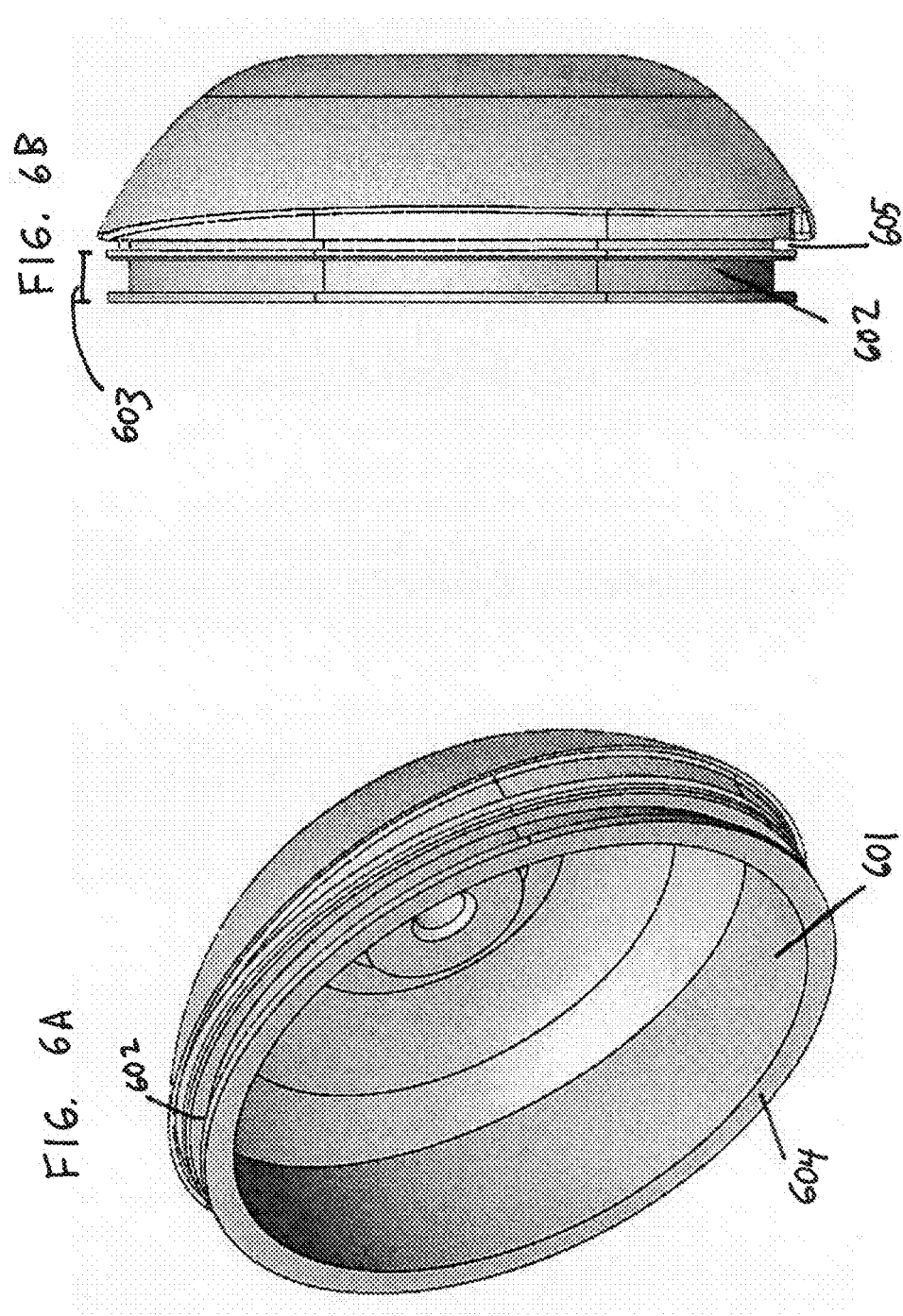

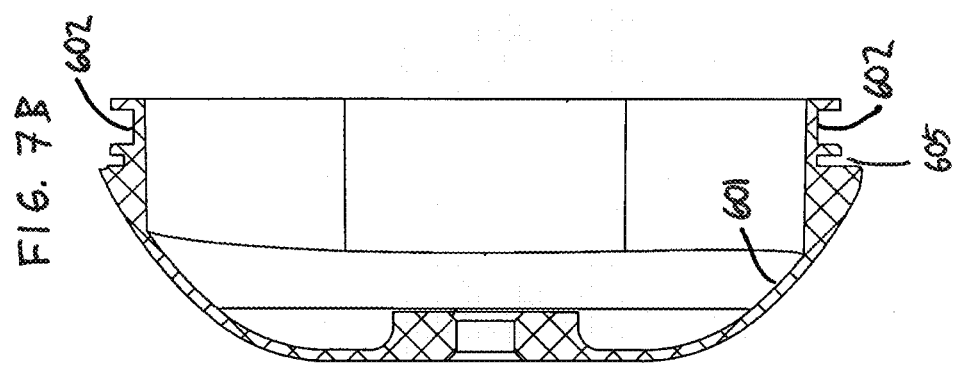
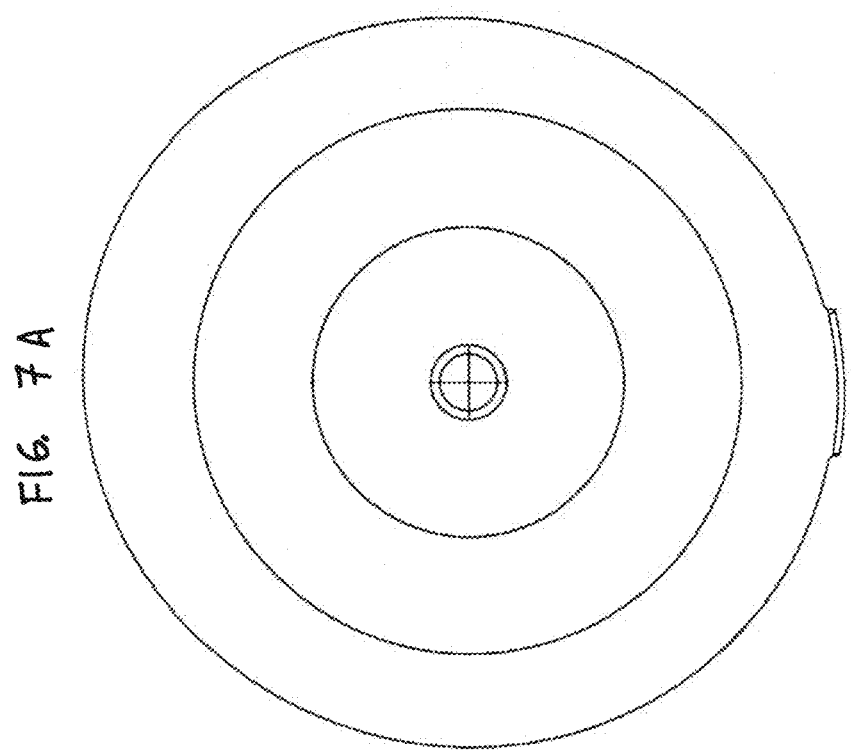

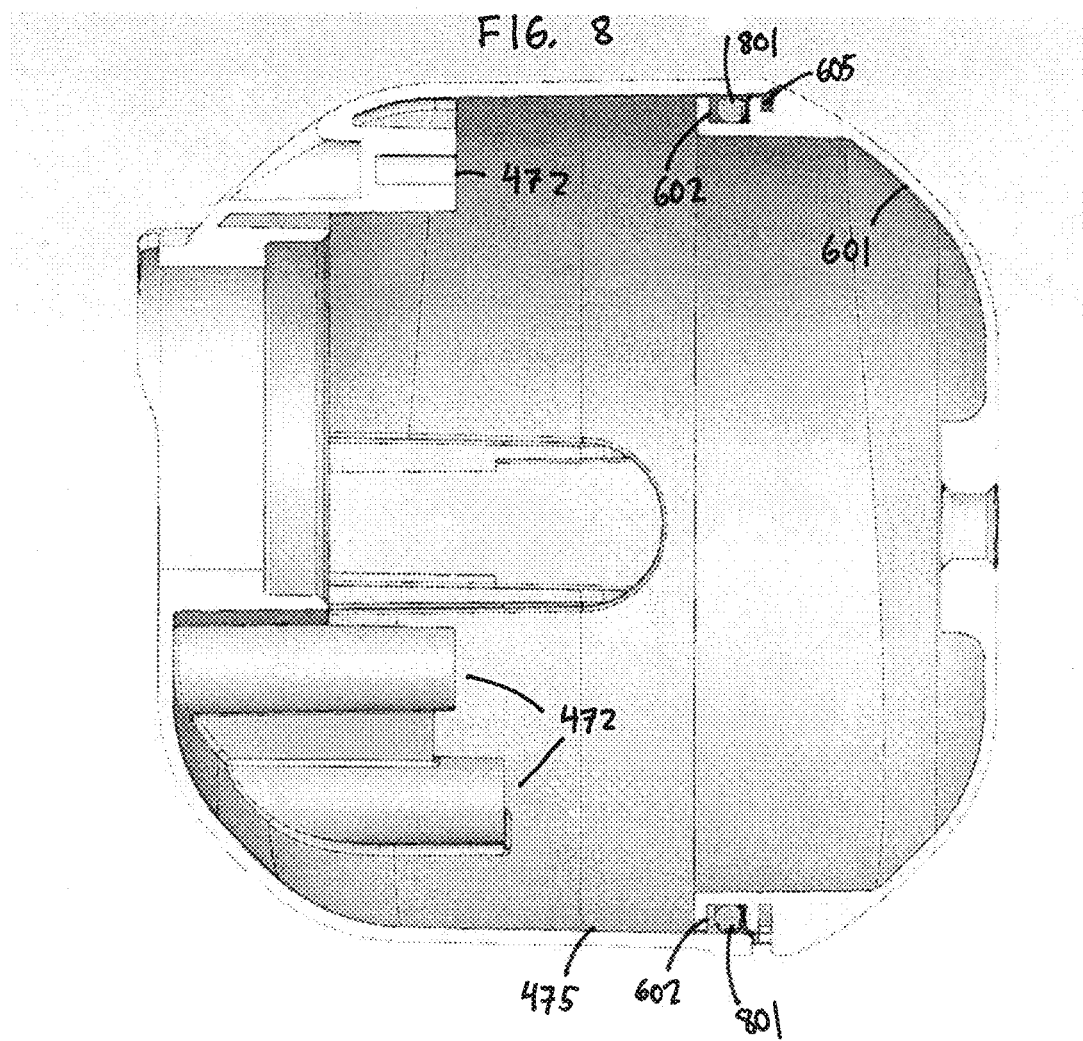

BALL TURRET HEAT SINK AND EMI SHIELDING

CROSS-REFERENCE TO RELATED APPLICATION

This application is related to U.S. patent application Ser. No. 13/220,619, entitled "Tilt-Ball Turret with Gimbal Lock Avoidance," by Tom Szarek et al., filed currently herewith, the entire disclosure of which is hereby incorporated by reference.

TECHNICAL FIELD

This subject matter relates generally to heat transfer and electromagnetic shielding with application to a ball turret.

BACKGROUND

The way that the Vietnam War is now remembered as the helicopter war, the current conflicts in Iraq and Afghanistan may be remembered for the use of unpiloted aerial surveillance (UAV) craft or drones. Drones may facilitate remote intelligence gathering, alleviating the need for foot soldiers to enter into hostile areas "blind," with little or no information about the location and strength of hostile forces. Drones may provide close combat support, such as identifying and eliminating targets of interest, alleviating the need to expose soldiers and/or airmen to potential small arms fire, mortars, rocket grenades, road-side bombs, anti-aircraft weaponry, missiles, and other dangers.

Although many presently used drones are roughly the same scale size as piloted aircraft, such aircraft are both relatively expensive and may be detected due to their size. Recently, smaller drones have been developed that may be deployed in greater numbers and are relatively less expensive resulting in greater use by individual units in the field. Smaller drones have certain tradeoffs as they cannot carry the amount of payload of a larger drone. Further, power for such smaller drones is limited due to the size of the aircraft and therefore operating periods are also limited.

Unpiloted drone aircraft typically mount a camera in a ball turret assembly which allows movement in three dimensions to allow the camera to track objects on the ground without altering the flight path of the aircraft. Data such as image data may be captured via a sensor such as a camera and transmitted back to a controller.

Because sensitive cameras and other equipment such as precise motors and gimbal systems are sensitive to weather, and must be kept from the elements, this equipment is generally enclosed in a casing or shell. Traditionally, turret shells have been made of glass or plastic. See, e.g., U.S. Patent App. No. 2009/0216394 A1 (published Aug. 27, 2009). Polymer and glass shells have the disadvantage that they may allow electromagnetic radiation to enter the turret and interfere with the sensitive camera equipment. Polymers and glasses are also generally thermal insulators, so that heat may build up inside the turret, compromising the equipment. Solid metallic turret shells are possible, but are heavy and not ideal for aerial reconnaissance craft.

Thus, it would be desirable to have a ball turret that is both lightweight and waterproof, but also contains shielding from electromagnetic radiation, and comprises a heat sink to remove heat that builds up in the turret.

BRIEF SUMMARY

The present disclosure relates to a turret useful for, among other things, housing a surveillance camera on the underside of a surveillance aircraft.

Such a turret may comprise a front shell and a rear shell. Preferably, the rear shell may have an o-ring groove, into which an o-ring may be placed, although an o-ring groove may alternatively be placed on the front shell, or there may be multiple o-rings. The front shell can have one or more transparent windows for transmission of light, infrared, or other electromagnetic radiation. This radiation can be accepted and recorded by a camera attached to the interior of the turret and facing a transparent window.

The front shell may be constructed of a polymer material which can be coated in its interior with an electrically- and thermally-conductive coating such as metal, most preferably copper. At least a portion of the rear shell may also be conductive, particularly in its interior. This rear portion is preferably a metal-coated polymer, but may also for example be an anodized metal. The composition of the front and rear shell sections may be different.

Joining the front and rear shells may be an electrically- and thermally-conductive elastomeric o-ring situated in the o-ring groove and in contact with the conductive surface of both the front and rear shells. In some configurations, the conductive coating of the inner surface of the shell may wrap around and cover an outer part of the shell to maintain electrical contact between the o-ring groove and the internal surface of the shell. Any such exterior coating of metal is preferably covered by a portion of the other shell, so as to prevent exposure to the elements.

The o-ring may seal the connection between the front and rear shells so that the enclosure formed by the shells is water-resistant or waterproof under the design conditions of the aircraft with at least a margin or safety. Preferably, the o-ring may be electrically conductive and have enhanced thermal conductivity beyond typical elastomeric substances. For example, specialized elastomeric substances known in the art might have thermal conductivities at normal operating conditions greater than about 0.50 W/(m·K), or often significantly higher. Electrically, there is preferably an electrical connection between the interior front and rear shell surfaces through the o-ring so that as a whole, the turret acts as an electromagnetic shield. Thus, it is preferable to maximize the amount of interior surface that is electrically conductive, and to maintain electrical connection throughout the interior surface.

Various additional embodiments, including additions and modifications to the above embodiments, are described herein.

BRIEF DESCRIPTION OF THE DRAWINGS

The accompanying drawings, which are incorporated into this specification, illustrate one or more exemplary embodiments of the inventions disclosed herein and, together with the detailed description, serve to explain the principles and exemplary implementations of these inventions. One of skill in the art will understand that the drawings are illustrative only, and that what is depicted therein may be adapted, based on this disclosure, in view of the common knowledge within this field.

In the drawings:

FIGS. 3A-C illustrate views of the ball turret of FIGS. 2A-E. In particular, FIG. 3A is a cross-section view, FIG. 3B is a cross-section top view taken along the line 460 in FIG. 3A; FIG. 3C is a cross-section top view of the example ball turret assembly of FIG. 2A;

FIGS. 4A-D are views of an example front shell of a ball turret. FIGS. 4A and 4C are side views, FIG. 4B is a view from the rear, and FIG. 4D is a cross-section top view taken along the line 470.

FIGS. 5A-B are different perspective views of a front shell.

FIG. 6A is a perspective view, and FIG. 6B is a perspective view of a rear shell.

FIG. 7A is a back view, and FIG. 7B is a cross-section side view, of a rear shell.

FIG. 8 is a side and cross-sectional view of a front shell engaged with a back shell.

DETAILED DESCRIPTION

Various example embodiments of the present inventions are described herein in the context of providing a shell for a camera turret for attachment to a reconnaissance aircraft that may shield against electromagnetic radiation and may effectively dissipate heat that builds up in the system. The shell is also preferably lightweight and waterproof.

Those of ordinary skill in the art will understand that the following detailed description is illustrative only and is not intended to be in any way limiting. Other embodiments of the present inventions will readily suggest themselves to such skilled persons having the benefit of this disclosure, in light of what is known in the relevant arts, the provision and operation of information systems for such use, and other related areas.

Not all of the routine features of the exemplary implementations described herein are shown and described. In the development of any such actual implementation, numerous implementation-specific decisions must be made in order to achieve the specific goals of the developer, such as compliance with regulatory, military, safety, social, environmental, health, and business-related constraints, and that these specific goals will vary from one implementation to another and from one developer to another. Moreover, such a developmental effort might be complex and time-consuming, but would nevertheless be a routine undertaking of engineering for those of ordinary skill in the art having the benefit of this disclosure.

Throughout the present disclosure, relevant terms are to be understood consistently with their typical meanings established in the relevant art. However, without limiting the scope of the present disclosure, exemplary clarifications and descriptions of certain terms are provided for relevant terms and concepts as set forth below:

As used herein, the term transparent includes transparency in any appropriate wavelength of electromagnetic (EM) radiation. It may include transparency in a very broad range of EM frequencies, or a very narrow set of frequencies. Most useful is transparency in the visible and/or infrared regions of the spectrum; however, other regions may also be useful for imaging purposes.

As used herein, the term water-resistant means that water does not penetrate under any expected operating conditions, including adverse weather.

Figure 1A:
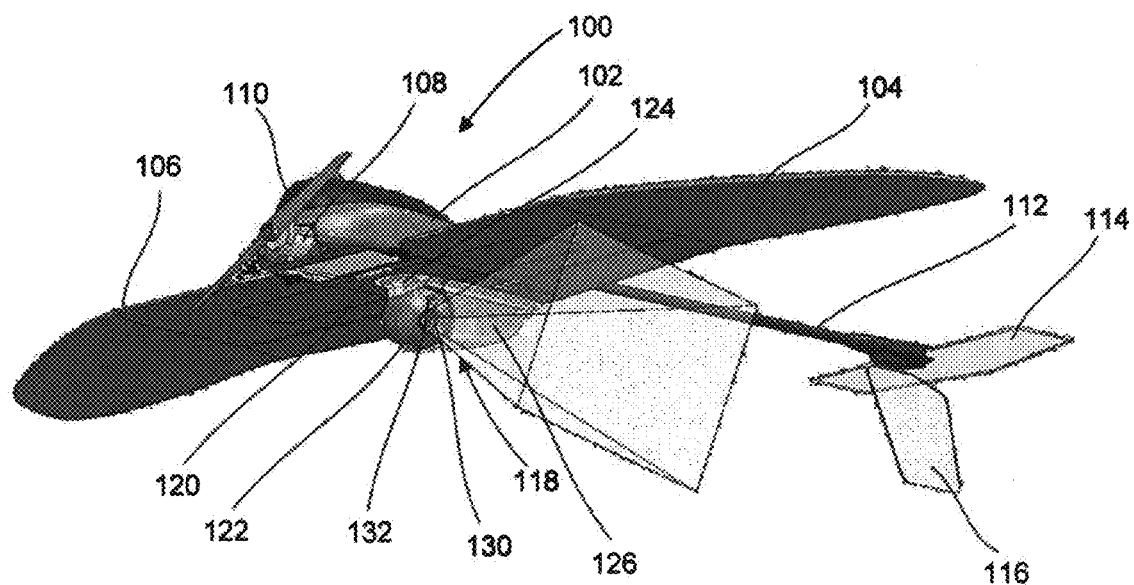
FIGS. 1A and 1B illustrate an unpiloted surveillance aircraft having an example ball turret assembly.
Figure 1B:
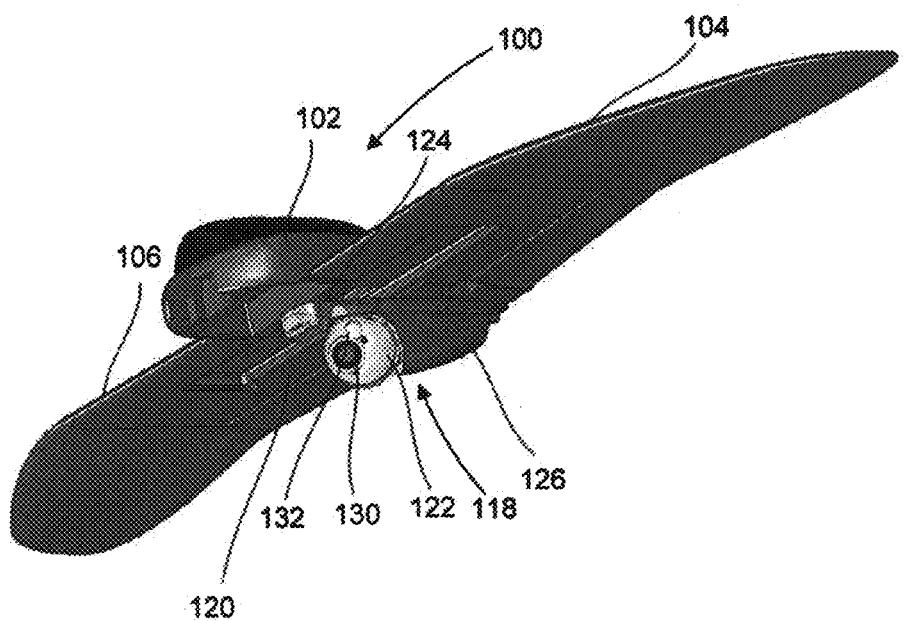

FIGS. 1A and 1B are perspective views of an unpiloted reconnaissance aircraft 100. The example aircraft 100 may have a fuselage 102 mounting a left wing 104 and a right wing 106. The aircraft 100 may be powered by an engine 108 which rotates a propeller 110. The aircraft 100 may be stabilized with the assistance of elevators 114 and a tail 116 mounted on a boom 112. Preferably, the aircraft 100 may be small enough to be carried by an individual soldier and have a top speed of preferably about 55 knots and a cruising speed of about 25 knots. However, the characteristics of the aircraft may vary widely in accordance with the inventions claimed herein. The ball turret assemblies described herein may be attached to any suitable aircraft.

The aircraft 100 may include a ball turret assembly 118 that may be suspended from an under-surface 120 of the fuselage 102. The ball turret assembly 118 may include a ball turret 122 that may be mounted in a housing 124 on the under surface 120. The ball turret 122 may be mounted in front of a fairing 126 that may also be part of the housing 124. Preferably, the ball turret 122 may hold an infrared camera 130 and a color camera 132. In one example, the infrared camera 130 may be a MicroTau 320 or 640 model camera available from FLIR and the color camera is a 5 megapixel Model MT9P031 EO sensor. However, the inventions described herein may also be used with any suitable camera devices.

If two cameras are used in accordance with this example, both of them are preferably configured for taking approximately 30 frames per second video stream of images but may also send still images at a different, preferably higher, resolution. Other types of cameras and/or sensors may also be mounted in the ball turret 122, either in addition to or in place of those shown in the figures. The ball turret 122 may be rotated by a yoke which is mounted on the fairing 126. In a preferably configuration, the fairing 126 in combination with the ball turret assembly 118 may reduce drag because the yoke is located behind the ball turret 122. By actuators for tilting and rolling the ball turret 122, the cameras 130 and 132 may be directed toward areas under the under surface 120 of the fuselage 102. As shown in FIG. 1A, the ball turret is rotated to point the cameras 130 and 132 to the left side of the aircraft 100. FIG. 1A shows an approximate imaging area that may be viewed by the cameras 130 and 132 in this position. FIG. 1B shows an example of the ball turret 122 rotated to position the cameras 130 and 132 to view an area to the front of the aircraft 100.

Figure 2A:
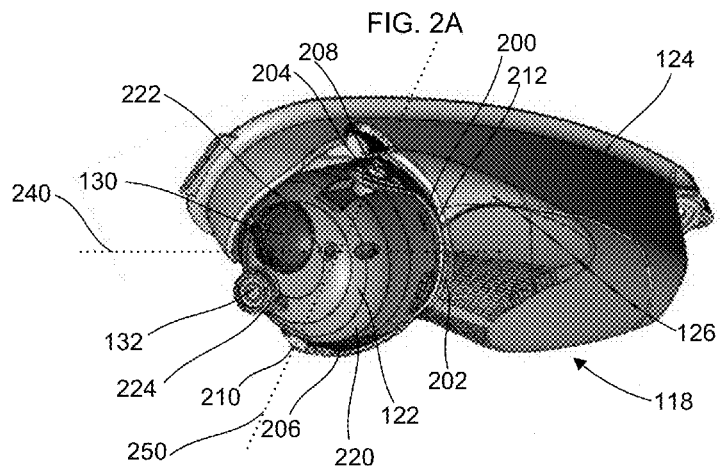
FIGS. 2A-E are close up views of the example ball turret assembly mounted on the aircraft of FIGS. 1A-B. Shown are a perspective view (FIG. 2A), a bottom view (FIG. 2B), a side view (FIG. 2C), a front view (FIG. 2D) and a rear view (FIG. 2E).
Figure 2B:
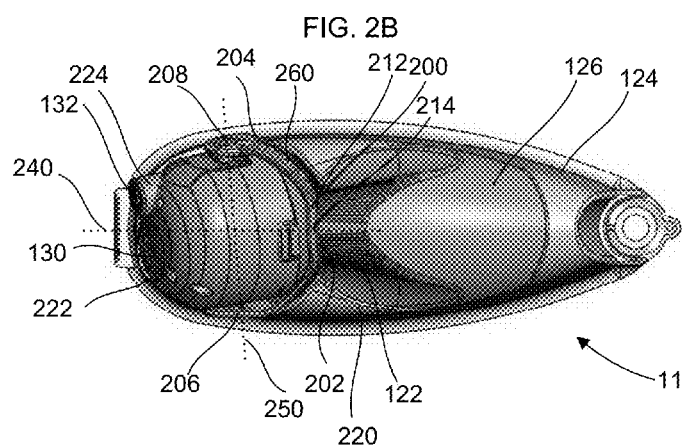
Figure 2D:
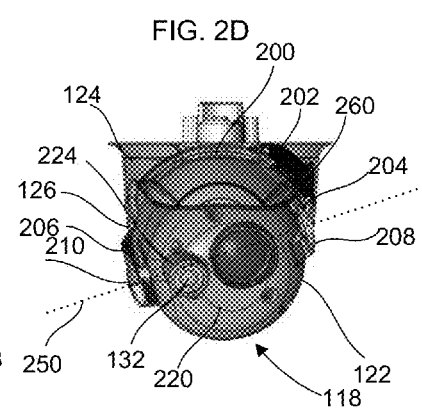
Figure 2C:
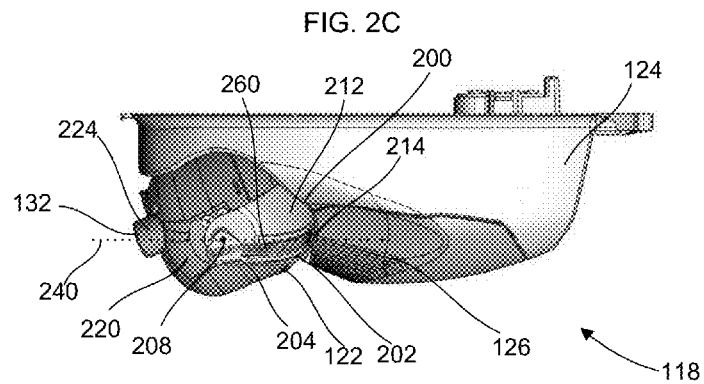
Figure 2E:
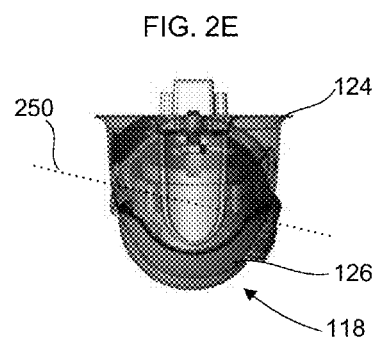

FIGS. 2A-2E are close up views of the example ball turret assembly 118 in FIG. 1. FIG. 2A is close up perspective view of the example ball turret assembly 118, FIG. 2B is a bottom view of the example ball turret assembly 118, FIG. 2C is a side view of the example ball turret assembly 118, FIG. 2D is a front view of the example ball turret assembly 118 and FIG. 2E is a rear view of the example ball turret assembly 118. The ball turret assembly 118 may include the ball turret 122 mounted on the fairing 126 on the under surface 120 of FIG. 1 via a gimbal assembly 200. A yoke 202 may extend from the fairing 126. The yoke 202 may include a pair of forks 204 and 206 that have ends that hold the ball turret 122 via pins 208 and 210. The forks 204 and 206 may have respective opposite ends from the pins 208 and 210 connected by a cross bar 212. The cross bar 212 may be attached to a roll drive shaft 214 that supports the yoke 202 from the fairing 126. The ball turret 122 may include an exterior surface 220 that is preferably waterproof and sealed to protect the mechanical and electrical components such as the cameras 130 and 132 stored therein. Because the yoke 202 preferably does not have any actuating or electronic components the number of parts requiring water-proofing may also be decreased. In this example, the exterior surface 220 may have an aperture 222 for infrared camera 130 and a mounting cylinder 224 for color camera 132.

A roll axis is represented by a dashed line 240 which points forward relative to the aircraft 100. The ball turret 122 may preferably be rotated around the roll axis 240 via the roll drive shaft 214 being rotated by a roll actuator in the fairing 126. A tilt axis represented by a dashed line 250 is 90 degrees offset from the roll axis 240. Preferably, the ball turret 122 may therefore be rotated on the forks 204 and 206 around the tilt axis 250 via a tilt actuator contained in the turret 122. A wiring harness 260 containing wiring for power, data and communications may extend from the fairing 126 to the ball turret 122 through the interior of the drive shaft 214 and be attached to the yoke 202 and follow the fork 204 to the interior of the ball turret 122.

Various means for positioning and directing the turret are known in the art. Certain such means are disclosed in FIGS. 3A and 3B show cross-section views of the example ball turret 122 and the related ball turret assembly 118 of FIG. 2. As shown in the example of FIGS. 3A-3B, an interior surface 400 of the ball turret 122 may enclose various mechanical and electrical components. An infrared camera 130 may be mounted on, or wired to, a circuit board 410 while the color camera 132 may be mounted on or associated with a circuit board 420. The circuit boards 410 and 420 may be fixed on the interior surface 400 in order to orient the infrared camera 130 through the aperture 222 and the color camera 132 through the mounting cylinder 224. Circuit boards 410 and 420 may also be condensed into a single circuit board, and may be placed anywhere within the ball turret where there is space, or may in a less preferred embodiment be placed outside the ball turret. Various means of wiring may be used, depending on the contents of the turret, and the number, type, and placement of cameras.

The tilt actuator may include a tilt motor 430 that rotates a drive shaft 432. The drive shaft 432 may drive the gears in a gear box 434. The gear box 434 may down-shift the rotations from the motor 430 to rotate a drive shaft 436 that is mounted on the pin 208 rotatably coupled to the fork 204 of the yoke 202. The other fork 206 of the yoke 202 may be rotatably mounted on the pin 210 on the exterior of the ball turret 122.

The yoke 202 may be mounted on the drive shaft 214 connected to a fairing 126. The fairing 126 may enclose the actuators for the roll or pan motion. The roll actuator thus may drive a drive shaft 214 and a yoke 202. The fairing 126 may enclose a pan or roll motor 440 which rotates a drive shaft 442 which drives a gear box 444. The gear box 444 in turn may drive the drive shaft 214 to rotate the yoke 202. FIG. 3C is a top view of the mounting 124 which includes the fairing 126 and the ball turret 122. The fairing 126 may in one embodiment enclose a circuit board 450 that hold the electronics for controlling the tilt and roll actuators. A vertical tab 452 may include an electronic connector 454 which provides connections to electronic components contained in the fuselage 102. A set of cables 456 may extend from the connector 454 through an aperture 458 to provide control and data signals to and from the electronic components in the fairing 126 and the ball turret 122.

As shown in FIG. 2B, the wiring harness 260 containing wiring for power, data and communications may extend from the fairing 126 to the ball turret 122 through the interior of the drive shaft 214. As shown in FIGS. 2B and 2C, the wiring harness 260 may be attached to the yoke 202 and follow the fork 204 to the interior of the ball turret 122. The controls for the roll and tilt actuators should preferably prevent the ball turret 122 from rotating the yoke 202 to tangle the wiring harness 260. Because the data connections are hardwired from sensors such as the cameras 130 and 132, maximum bandwidth may preferably be achieved from image data acquired by the cameras 130 and 132.

This illustrative arrangement may allow the cameras 130 and 132 in the turret 122 maximum view of the area of interest and reduces the drag of the turret assembly 118. As explained above, the pan or roll mechanics (actuators) driving the yoke 202 may be located behind the ball turret 122 in the fairing 126. Because the actuators for the roll motion are preferably mounted in the fairing 126 and movement occurs preferably in the roll actuator in the fairing 126 to rotate the yoke 202 holding the ball turret 122, the yoke 202 in a preferred embodiment has no moving parts or electronic components. This configuration may, in a particularly preferred embodiment, allow the ball turret 122 and fairing 126 alone to be water proofed to protect the electronic and mechanical components of the ball turret assembly 118 contained in the ball turret 122.

The turret 122 preferably has a spherical or ball shape because of ease in maneuvering and thermodynamic properties. However, other shapes are possible, such as a teardrop shape, an oval or a rectangular prism.

Such a turret may comprise a front shell and a rear shell. FIGS. 4A-D and FIGS. 5A-B are various views of an example front shell. FIGS. 4A and 4C are side views, FIG. 4B is a view from the rear, and FIG. 4D is a cross-section top view taken along the line 470. The front shell can have one or more transparent windows 471 for transmission of light, infrared, or other electromagnetic radiation. This radiation can be accepted and recorded by a camera attached to the interior of the turret and facing one of the transparent windows. In one embodiment, there can be two camera assemblies, one for detecting and recording infrared light, and another for detecting and recording visible light. Other combinations are also possible, and other camera types, such as detectors for ultraviolet light. There may also be multiple infrared cameras for multiple wavelength ranges of infrared light. In one embodiment, there may be two identical or similar cameras or camera lenses configured to record a stereoscopic view. Cameras may preferably be mounted to mounting points 472 to the inner surface 475 of the front shell by any means of attachment known in the art. Preferably, the cameras will be attached through conductive means, such as conductive bolts, clamps, or the equivalent. Thermal grease, thermal adhesives, thermal pads, or the equivalent may also be used to enhance the thermal connection between the cameras and the inner surface of the front shell. Alternatively, cameras may be attached to the rear shell by the same means.

The front shell may be constructed of a lightweight material. Preferably, this material will be a polymer, in one embodiment xenoy. Another suitable embodiment may be polycarbonate, or a mixture of polycarbonate and polybutylene terephthalate (PBT) and/or polyethylene terephthalate (PET). The polymer may in one embodiment be formed in a mold, or by numerous other means known in the art.

The interior surface of the front shell may be coated in its interior 475 with an electrically- and/or thermally-conductive coating such as metal. This coating can be applied by means known in the art, such as electroplating. Preferably, the coating will not be magnetic. The plating may have one or more layers, possibly of different metals. For example, in one embodiment, the conductive coating is a thin layer of nickel, followed by a thicker layer of copper, with a small layer of nickel on top for enhanced corrosion resistance. In this embodiment, the copper layer thickness may preferably be at least approximately 0.0635 mm (0.0025 inches) with the total coating thickness approximately 0.762 mm (0.003 inches). Other combinations of metal, or number of layers, or thickness of layers, are possible. For example, in one preferable embodiment, the total thickness of metal will be within the range of about 0.07 millimeters to about 0.13 millimeters. If copper is used in addition to another less-conductive metal, it is preferable to use as much copper as possible to enhance thermal and electrical conductivity. There are other highly conductive metals equivalent to copper, and there are other suitable metals that may take the place of Nickel in the above example.

The turret, in one embodiment, may comprise a motor (430 of FIG. 3B) or multiple motors for rotating a drive shaft (436 of FIG. 3B) or multiple drive shafts. The turret may also contain a gear box (434 of FIG. 3B) which may be attached to a region 473 of the inner surface of the front shell. A shaft may exit the turret through an aperture 474. Preferably, this shaft is thermally conductive, and may act as a heat sink to transfer heat collected from the conductive inner surface of the turret to one or more locations exterior to the turret. In one embodiment, heat is ultimately dissipated by convection from wind as the aircraft travels through the air. Where the shaft leaves the turret will preferably be sealed to ensure that the turret is water resistant or waterproof. Such sealing may be accomplished with an o-ring or other means known in the art.

There may be several sources of heat within the turret. Each of the cameras may contribute heat, and the motor will also contribute heat. Other associated wiring and electronics may also generate heat. In one illustrative embodiment, an IR camera in the turret may generate 1 watt of heat, while a motor may generate 2 watts of heat.

FIGS. 6A-6B and FIG. 7A-7B are views of an example rear shell. Preferably, at least a portion of the rear shell may also be conductive at least in its interior 601. For example, the composition and plating of the rear shell may be substantially identical to that of the front shell; however, the composition of the front and rear shells can also be significantly different. It will preferably be a metal-coated polymer.

Alternatively, because the rear shell can in one embodiment be made smaller, or substantially smaller, than the front shell, the rear shell may be made of an anodized metal because weight concerns are not as significant as for the front shell. If the rear shell is composed of anodized metal, this means that there is an internal metallic layer, coated with an oxide of that metal or in one embodiment an oxide of a second metal that is coated on the base metal for the rear shell. The internal metallic layer is preferably conductive, and will serve to conduct heat and electricity, this aiding in electromagnetic shielding. If an anodized metallic rear shell is used, the region near the o-ring groove 602 (region 603 in the example of FIG. 6B) in contact with the o-ring should preferably have a conductive coating for engagement with the o-ring, in which the conductive coating is electrically connected to the bulk metal of the rear shell. Means of coating a region of an anodizable metal with another metal to prevent anodizing in that region are known in the art. Less preferably, if the anodic layer is sufficiently small, depending on the metal and other conditions, the electrical and thermal conductivity may be sufficient without such coating.

Preferably, the rear shell may have an o-ring groove 602, into which an o-ring may be placed, although an o-ring groove may alternatively be placed on the front shell, or there may be multiple o-rings.

Joining the front and rear shells may be an electrically- and/or thermally-conductive elastomeric o-ring (801 in FIG. 8) situated in the o-ring groove and in contact with the conductive surface of both the front and rear shells. In some configurations, the conductive coating of the inner surface of the shell may wrap around and cover an outer part of the shell to maintain electrical contact between the o-ring groove and the internal surface of the shell. Thus, region 603 of FIG. 6B and surface 604 of FIG. 6A may be coated, and preferably form a continuous coating across the o-ring groove 602 to the interior surface of the rear shell 601. When the front shell and rear shell are engaged, as shown in FIG. 8, the front shell in this embodiment preferably covers the coated portion, so as to prevent exposure to the elements.

The o-ring may seal the connection between the front and rear shells so that the enclosure formed by the shells is water-resistant or waterproof under the design conditions of the aircraft with at least a margin or safety. Preferably, the o-ring 801 may be electrically conductive and have enhanced thermal conductivity beyond typical elastomeric substances. For example, in one embodiment the o-ring may be composed of a metal-filled elastomer such as silicone rubber. Examples of metal-filled and other types of relatively-conductive elastomers are known in the art. (See, e.g., U.S. Pat. No. 7,695,647, U.S. Application No. 2011/0103021 A1). Specialized, electrically conductive elastomeric substances known in the art might in one example have thermal conductivities at normal operating conditions greater than about 0.50 W/(m·K), or often higher, such as 3 W/(m·K), 7.5 W/(m·K), or higher.

Electrically, there is preferably an electrical connection between the interior front 475 and rear 601 shell surfaces through the o-ring 801 so that as a whole, the turret acts as an electromagnetic shield. Thus, it is preferable to maximize the amount of interior surface that is electrically conductive, and to maintain electrical connection throughout the interior surface.

There are many ways known in the art to mechanically connect a shell such as the front shell to rear shell. In addition, one of the shells may have a plurality of compliant members attached to it that may engage in corresponding cavities or holes 501 in the other shell, thus comprising a spring-loaded engagement mechanism. When engaged, the compliant springs or tags lock with cavities or holes and prevent the front and rear shells from coming apart. This arrangement has the advantage that it may be possible to disassemble the turret without loosening bolts, in order to service the cameras or other elements within the turret, or to replace the o-ring or other parts. The front and rear shell may, for example, be disengaged by bending or compressing the springs or tags to the point where they clear the locking mechanism.

Alternatively or in addition, one of the shells may be configured with a snap ring groove so that a portion of the other shell snaps into place to help hold the front and rear shells together. For example, a groove 605 may be provided in the rear shell (see FIGS. 6B, 7B, and 8), and the edge of the front shell may comprise, in at least some locations along its perimeter, a small lip that engages with groove 605 and creates a locking mechanism.

Exemplary embodiments have been described with reference to specific configurations. The foregoing description of specific embodiments and examples of the invention have been presented for the purpose of illustration and description only, and although the invention has been illustrated by certain of the preceding examples, it is not to be construed as being limited thereby.

What is claimed is:
1. A water resistant and electromagnetically shielded turret assembly comprising:
 a front shell and a rear shell, either the front shell or the rear shell comprising an o-ring groove, the front shell comprising one or more transparent windows, and the front and rear shells each having an inner and outer surface,
  wherein the front shell primarily comprises a first polymer material and is coated on at least the majority of its inner surface with a layer of a first metal composition, and wherein the rear shell comprises at least a conductive portion comprising a second metal composition;

an electrically-conductive elastomeric o-ring situated in the o-ring groove and in contact with a contact surface of the front shell, and in contact with a contact surface of the rear shell, so as to form a water-resistant seal between the front shell and the rear shell;

wherein the contact surface of the front shell is electrically conductive, said layer being electrically connected with the coated inner surface of the front shell, wherein the contact surface of the rear shell is conductive and electrically connected to said conductive portion of the rear shell, wherein the front shell, the o-ring, and the rear shell together comprise a water-resistant enclosure and further comprise an electromagnetic shield; and at least one camera assembly attached to the inside of the front shell or the rear shell, capable of receiving and recording electromagnetic radiation that passes through at least one of the one or more transparent windows.

2. The assembly of claim 1, further comprising one or more motors for rotating the turret assembly, said one or more motors enclosed by the water-resistant enclosure.

3. The assembly of claim 1, wherein the turret has a generally spherical shape.

4. The assembly of claim 1, wherein the o-ring has a thermal conductivity at normal operating conditions greater than about 0.50 W/(m·K).

5. The assembly of claim 1, wherein the contact surface of the front shell comprises a continuation of the same coating as the layer of the first metal composition coated on the inner surface of the front shell.

6. The assembly of claim 1, wherein the rear shell primarily comprises a second polymer material, and said conductive portion of the rear shell comprises a layer of the second metal composition coated on the second polymer material.

7. The assembly of claim 6, wherein the second conductive metal composition is substantially the same as the first conductive metal composition.

8. The assembly of claim 6, wherein the second polymer material is of substantially the same composition as the first polymer material.

9. The assembly of claim 1, wherein the rear shell primarily comprises a metal.

10. The assembly of claim 9, wherein said metal of the rear shell is anodized so that there is an internal layer of metal covered by a relatively thin anodic layer, and wherein said conductive portion comprises the internal layer.

11. The assembly of claim 1, wherein the layer of the first metal composition is less than about 0.5 millimeter in thickness.

12. The assembly of claim 1, wherein the first metal composition is substantially copper.

13. The assembly of claim 11, wherein the layer of the first metal composition is between about 0.07 millimeters and about 0.13 millimeters in thickness.

14. The assembly of claim 1, wherein the rear shell comprises the o-ring groove, the contact surface of the rear shell comprises at least a portion of the surface of the o-ring groove, and the contact surface of the rear shell is part of the outer surface of the rear shell.

15. The assembly of claim 14, wherein the rear shell primarily comprises a second polymer material, and said conductive portion of the rear shell comprises a layer of the second metal composition coated on the second polymer material, and wherein the contact surface of the rear shell comprises a continuation of the same layer of the second metal composition coated on the second polymer material.

16. The assembly of claim 1, further comprising:
a plurality of compliant members attached to a first one of said front or rear shell; and
corresponding to each of the compliant members, a plurality of cavities or apertures within the second one of said first or rear shell;
wherein at least a portion of each compliant member engages with its corresponding cavity or aperture, to reversibly lock the front shell in position with the rear shell; and
wherein the rear shell is capable of being removed from the front shell by adding compression or tension to each of the compliant members to disengage said portion of each compliant member from its corresponding cavity or aperture.

17. The assembly of claim 1, further comprising a heat sink in contact with the inner surface of the front shell, for conducting thermal energy from the inside surface of the front shell to a location exterior to the turret.

18. The assembly of claim 1, further comprising one or more solid heat conduction channels in contact with the inner surface of the rear shell, for conducting thermal energy from the inside surface of the rear shell to one or more locations outside the turret.

19. The assembly of claim 1, wherein the camera assembly is attached to the inside of the front shell or rear shell via one or more thermally-conductive fasteners, and wherein the camera assembly is configured to generate at least about 1 watt of heat in normal, sustained, continuous operation.

20. The assembly of claim 1, wherein the o-ring has a thermal conductivity greater than about 3 W/(m·K) at normal operating conditions.

21. The assembly of claim 1, wherein there are at least two camera assemblies, wherein one of the camera assemblies comprises an infrared camera, and another one of the camera assemblies comprises a visible-wavelength camera.

22. A water-resistant turret adapted for mounting to the undersurface of an aircraft, comprising:
a first shell and a second shell, each shell comprising an inside surface and an outside surface, each inside and surface being an electrical conductor;
a camera assembly attached to the inside surface of the first shell or the second shell;
means for reversibly disengaging the first shell from the second shell to access the camera;
means for electrically connecting the inside surface of the first shell to the inside surface of the second shell; and
means for continuously conducting at least 3 watts of heat from the inside surface of the first and/or second shell to one or more locations exterior to the turret while the turret is in operation.

* * * * *